May 26, 1942.    J. W. FRENCH    2,284,049
OPTICAL OBSERVATION INSTRUMENT
Filed June 27, 1940    2 Sheets-Sheet 1
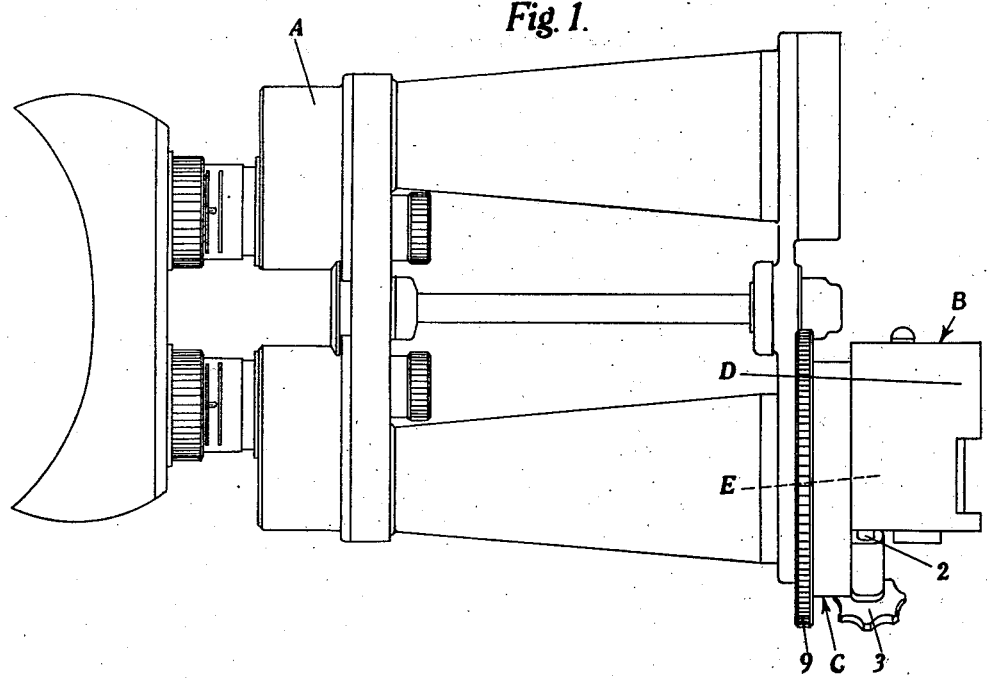
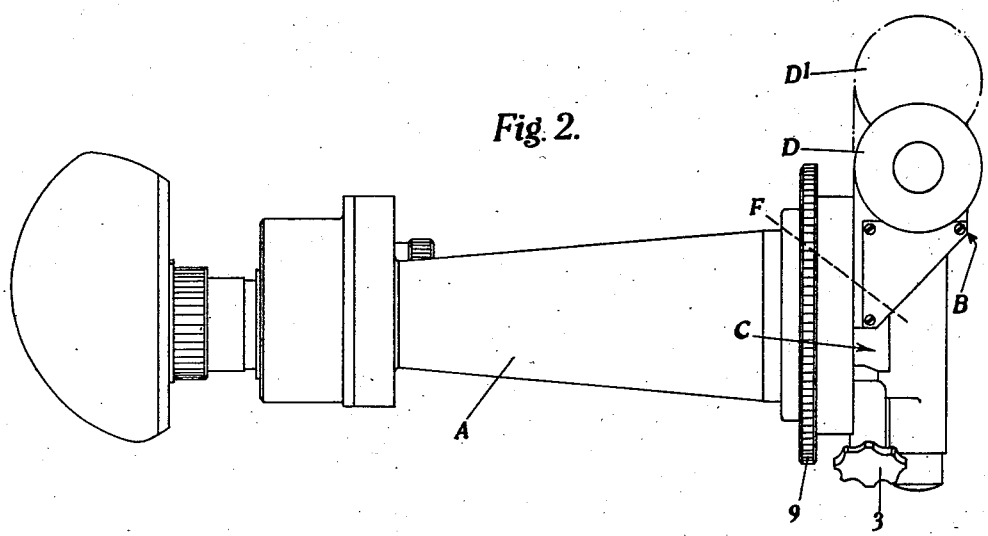
Inventor
James Weir French
by
Lancaster, Allwine and Rommel
Attorneys May 26, 1942.  J. W. FRENCH  2,284,049
OPTICAL OBSERVATION INSTRUMENT
Filed June 27, 1940  2 Sheets-Sheet 2
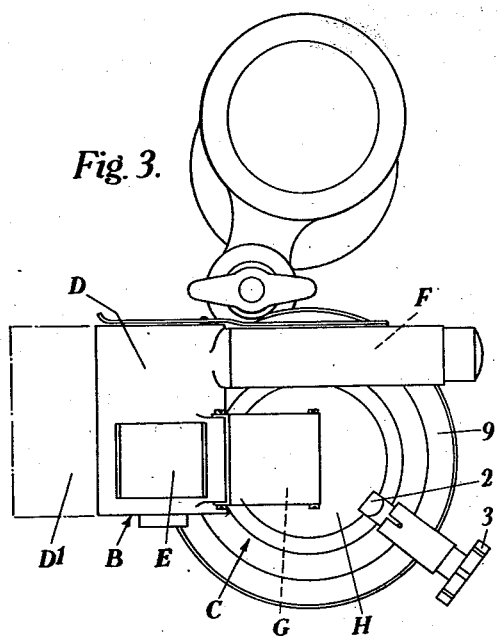
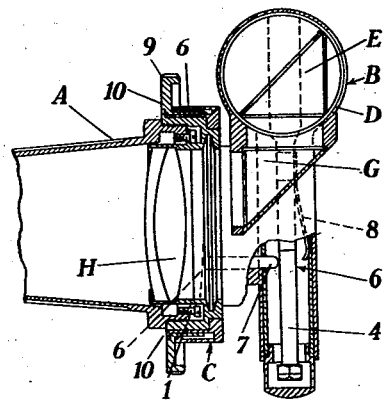
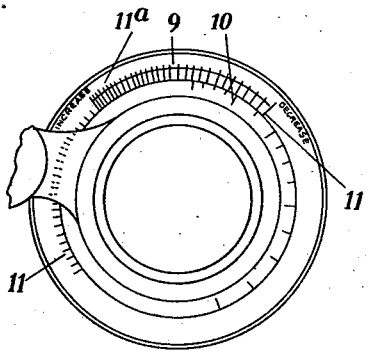
Inventor
James Weir French
by Lancaster, Allwine and Rommel
Attorneys Patented May 26, 1942

2,284,049

UNITED STATES PATENT OFFICE 2,284,049

OPTICAL OBSERVATION INSTRUMENT

James Weir French, Anniesland, Glasgow, Scotland, assignor to Barr and Stroud, Limited, Anniesland, Glasgow, Scotland Application June 27, 1940, Serial No. 342,821
In Great Britain May 31, 1939

5 Claims. (Cl. 88—2.7)

This invention refers to optical observation instruments of telescope type, monocular or binocular, intended to be carried in the hand or hands of the observer, and the object of the invention is, broadly speaking, to provide an improved form of instrument for estimation of the range of an object under observation (hereinafter referred to as the target) and more particularly to provide for the adaptation as range estimators of telescope instruments not ordinarily so adapted.

According to the present invention, an optical observation instrument has range estimating means comprising a reflecting arrangement for directing into the normal field of view a secondary beam of light which reaches the instrument at a position outwith the normal entrance aperture of the optical system, so that a normal image of the target and a secondary image of the target appear in the field of view, and provision is made for moving the reflecting arrangement and consequently displacing and setting the secondary image relative to the normal image, together with a scale arrangement whereby, from such setting and a known or assumed value of a target dimension, such as its height or length, there are obtainable readings of range of target, or with a known or assumed value of range of target, a reading of a required target dimension can be obtained.

A range estimating device may be constructed for application as a unit to an ordinary telescope instrument such as a prismatic monocular or binocular instrument at the objective end thereof, the device comprising a mounting adapted to be secured to the telescope tube or body, a reflecting arrangement carried by the mounting for directing into the entrance aperture of the instrument a secondary beam of light reaching the instrument at a position to the side of the normal entrance aperture, means for moving the reflecting arrangement to displace the secondary image so formed, and an appropriate scale arrangement.

Generally the reflecting arrangement is of doubly reflecting prism construction, being adapted to receive light from the target, to deflect it transversely relative to the optical axis of the instrument into the path of the light forming the normal image of the target, and then to direct it along said path to the eye of the observer. Thus, the reflecting arrangement may comprise two prisms, one for receiving light from the target and the other to receive light directed transversely by the first prism and to direct the said light along the path of the light forming the normal image, one of the prisms being angularly movable to displace and set the secondary image and the other being normally stationary relative to the instrument.

Conveniently the scales are of annular form with an annular operating head for effecting prism movement, the scales and head extending round the tubular body of the instrument. In such an arrangement motion may be transmitted from the head to the prism by means of an annular cam member coaxial with and moving with the head.

Preferably provision is made for moving the reflecting arrangement into an inoperative position without removing it from the instrument, so as to leave an entirely normal field of view.

The invention as applied to a prismatic binocular instrument will now be described with reference to the accompanying drawings, in which:

Figure 1 is a plan view,

Figure 2 is a corresponding side view,

Figure 3 is an end view as seen from the objective end of the instrument,

Figure 4 is a vertical longitudinal sectional view, and

Figure 5 illustrates the scale arrangement.

The drawings show a prismatic binocular instrument A of standard construction with a range estimating device B applied to the objective end of one limb of the instrument.

The device B comprises a mounting C, a prism carrier D supported on the mounting, a prism E movable in the prism carrier D, prism operating mechanism F, and a second prism G fixed in the prism carrier D.

The mounting C has a part of annular form to fit over the end of the binocular body, the end of the said body being provided with a grooved ring 1 screwed on to it to receive the mounting C, see Figure 4. The annular part of mounting C is adapted to be clamped to the ring 1 by means of a clamp 2 with head 3. When the mounting C is clamped to the binocular as shown, the prism G is in front of the upper part of the objective H and the prism E is directly above the prism G, while the operating mechanism F is at the side, clear of the objective.

The prism E is mounted in the carrier D so as to be angularly movable about a transverse axis parallel with the plane of the objective axes. The operating mechanism F comprises an arm 4 extending downwardly from the holder of prism E. On the annular part of the mounting C there is an annular cam 6, see Figure 4, capable of rotation about the axis of the objective. A push rod 7 bears at one end on the cam 6 and at the other end bears against the arm 4 of the prism holder, the arm 4 being held against the push rod 7 by a spring 8. The cam 6 has an annular operating head 9.

On rotation of the head 9, the cam 6 is rotated and by means of the push rod 7 in conjunction with the spring 8 the arm 4 is caused to swing, the effect of this swinging movement being to rotate the prism E in its carrier, so displacing the secondary image formed by means of the prisms E and G.

The form of the scales is indicated in Figure 5.

There is a stationary annular scale 10 located in an annular groove in the face of the annular head 9, this scale being graduated in accordance with target height values, while the face of the annular head 9 is graduated at 11 to represent range values.

Assuming that the observer is observing a ship, the range of which is to be determined and the height of which is known, for example, the height from the water-line to the funnel top, then by operation of the head 9 the observer displaces the secondary image until its water-line coincides with the funnel top of the normal image. He then can read off on the range scale 11 the range value corresponding with the known target height value appearing on the scale 10.

A particular use of the instrument is for station keeping at sea to enable ships to maintain a predetermined distance apart, and for this purpose a portion of the scale 11 is specially graduated at 11a as shown by the outer circular line in Figure 5 marked "Decrease" and "Increase" with range graduations rising in each direction from zero, to give direct indication as to whether, and if so by how much, the observer must decrease or increase his distance to keep his station.

The range estimating device can be readily detached from the instrument, leaving a normal binocular instrument. The device can be attached to the instrument in a position enabling it to effect measurement in any selected plane, say horizontally, the device being then attached to the instrument in a position at right angles to the position shown in the drawings, in which case settings of the secondary image relative to the normal image are made in the horizontal direction and, instead of target height values being used as a basis of measurement, transverse target length values are used. Further, if when observing, say a ship at sea at known range, the estimated horizontal base length differs from what the base length is known to be, it may be assumed that the ship is moving in a path which is not at right angles to the line of sight, and from the estimated and known base lengths the course of the ship may be determined.

The prism carrier D, with the prisms E and G and arm 4, can be pushed up into an inoperative position as indicated in dotted lines at D¹ in Figure 2, there being a spring detent or "clicker" to maintain these parts in their operative and inoperative positions.

I claim:

1. An optical observation instrument of the hand-carried type having a telescope optical system to form a normal image of a distant object by light received through an entrance aperture and provided with range estimating means comprising two reflectors, one located directly in front of the entrance aperture aforesaid and the other laterally thereof, to direct a secondary beam of light, which reaches the instrument at the second reflector and thus laterally to the side of the normal entrance aperture, into the optical system through the entrance aperture, one of the said reflectors being movable relative to the instrument to displace and set the secondary image of the object, formed by the secondary beam, relatively to the normal image, mechanism operable by the observer for moving said movable reflector, and a scale arrangement including two graduated elements, one graduated in accordance with object dimensions and the other in accordance with range values, the latter element moving with the second reflector relative to the first graduated element and the two graduated elements being readable against one another, so that when the two images are set into pre-determined relationship in the field of view, the range can be read off the range-graduated element against any given object dimension value or object dimension can be read off the object dimension scale against any given range value.

2. An optical observation instrument of the hand-carried type having a telescope optical system within a tubular body to form a normal image of a distant object by light received through an entrance aperture and provided with range estimating means comprising two reflectors, one located directly in front of the entrance aperture and the other laterally thereof, to direct a secondary beam of light, which reaches the instrument at the second reflector and thus laterally to the side of the normal entrance aperture, into the optical system through the entrance aperture, one of the said reflectors being movable relative to the instrument to displace and set the secondary image of the object, formed by the secondary beam, relatively to the normal image, mechanism with an annular operating head operable by the observer for moving said movable reflector, and an annular scale arrangement including two graduated elements, one graduated in accordance with object dimensions and the other in accordance with range values, the latter element moving with the second reflector relative to the first graduated element and the two graduated elements being readable against one another, so that when the two images are set into pre-determined relationship in the field of view, the range can be read off the range-graduated element against any given object dimension value, or object dimension can be read off the object dimension scale against any given range value, the annular operating head and the annular scale arrangement being co-axial with and extending around the tubular body of the instrument.

3. An optical observation instrument of the hand-carried type having a telescope optical system within a tubular body to form a normal image of a distant object by light received through an entrance aperture and provided with range estimating means comprising two reflectors, one located directly in front of the entrance aperture aforesaid and the other laterally thereof, to direct a secondary beam of light, which reaches the instrument at the second reflector and thus laterally to the side of the normal entrance aperture, into the optical system through the entrance aperture, one of the said reflectors being movable relative to the instrument to displace and set the secondary image of the object, formed by the secondary beam, relatively to the normal image, mechanism with an annular operating head operable by the observer and an annular cam member moving with the annular head for moving said movable reflector, and an annular scale arrangement including two graduated elements, one graduated in accordance with object dimensions and the other in accordance with range values, the latter element moving with the second reflector relative to the first graduated element and the two graduated elements being readable against one another, so that when the two images are set into pre-determined relationship in the field of view, the range can be read off the range-graduated element against any given object dimension value, or object dimension can be read off the object dimension scale against any given range value, the annular operating head and the annular scale arrangement being co-axial with and extending around the tubular body of the instrument.

4. An optical observation instrument of the hand-carried type having a telescope optical system to form a normal image of a distant object by light received through an entrance aperture and provided with range estimating means comprising two reflectors, one located directly in front of the entrance aperture aforesaid and the other laterally thereof, to direct a secondary beam of light, which reaches the instrument at the second reflector and thus to the side of the normal entrance aperture, into the optical system through the entrance aperture, one of the said reflectors being movable relative to the instrument to displace and set the secondary image of the object, formed by the secondary beam, relatively to the normal image, mechanism operable by the observer for moving said movable reflector, and a scale arrangement including two graduated elements, one graduated in accordance with object dimensions and the other in accordance with range values, the latter element moving with the second reflector relative to the first graduated element and the two graduated elements being readable against one another, so that when the two images are set into predetermined relationship in the field of view, the range can be read off the range-graduated element against any given object dimension value or object dimension can be read off the object dimension scale against any given range value, there being an auxiliary scale with range graduations rising in each direction from zero, movable with the range scale against the object dimension scale, to show increase or decrease variations from a predetermined range between observer and object.

5. An optical observation instrument of the hand-carried type having a telescope optical system within a tubular body to form a normal image of a distant object by light received through an entrance aperture and provided with range estimating means comprising two reflectors, one located directly in front of the entrance aperture aforesaid, and the other laterally thereof, to direct a secondary beam of light which reaches the instrument at the second reflector and thus laterally to the side of the normal entrance aperture, into the optical system through the entrance aperture, one of the said reflectors being movable relative to the instrument to displace and set the secondary image of the object, formed by the secondary beam, relatively to the normal image, mechanism with an annular operating head operable by the observer and an annular cam member moving with the annular head for moving said movable reflector, and an annular scale arrangement including two graduated elements, one graduated in accordance with object dimensions and the other in accordance with range values, the latter element moving with the second reflector relative to the first graduated element and the two graduated elements being readable against one another, so that when the two images are set into predetermined relationship in the field of view, the range can be read off the range graduated element against any given object dimension value, or object dimension can be read off the object dimension scale against any given range value, the annular operating head and the annular scale arrangement being co-axial with and extending around the tubular body of the instrument, there being an auxiliary scale with range graduations rising in each direction from zero, movable with the range scale against the object dimension scale, to show increase or decrease variations from a predetermined range between observer and object.

JAMES WEIR FRENCH.